Patented May 24, 1938

2,118,431

UNITED STATES PATENT OFFICE 2,118,431

ART OF COLORING AND MARKING MATERIALS

Albert E. Gessler, Ardsley-on-Hudson, N. Y., assignor to Interchemical Corporation, a corporation of Ohio No Drawing. Application January 14, 1935, Serial No. 1,605

9 Claims. (Cl. 8—5)

This invention relates to improvements in the art of coloring and marking materials. It provides a new method for coloring, partially coloring and marking materials of many different sorts, and a new composition of matter which I term a coloring medium and which may be used for many of the purposes for which printing inks, paints, lacquers, stains and dyes have heretofore been used. No claim is made in the present application to the coloring medium, since this is claimed in my co-pending application Serial No. 163,243, filed September 10, 1937. The invention effects improvement in the coloring art both in the quality of the product and in economy of procedure.

The new composition of coloring medium which I have invented has the property of precipitating a water-insoluble pigment when water is applied to it. In coloring or marking materials, the new coloring medium is first applied to the material and thereafter water is applied to the coloring medium on the material. This causes a precipitation of a finely divided, water-insoluble pigment on the surface and in the pores and fibres of the material, producing a brilliant water fast color.

The new coloring medium has been produced by dissolving pigment-forming reagents in an organic solvent which is miscible with water. The pigment-forming reagents are adapted to enter into a reaction producing a practically water-insoluble pigment. For most purposes, a thickener is also dissolved in the solution to facilitate the application of the coloring medium and to prevent it from spreading on the material to which it is applied.

The organic solvent used in the composition is miscible with water. It is in many cases desirable that it should be of low volatility in order that the composition may not dry upon the printing press or brush or other means by which it may be applied. Diethylene-glycol-ethyl-ether and diethylene-glycol-butyl-ether are examples of organic solvents having these characteristics. The solvent is free from water, or practically so.

The pigment-forming reagents are soluble in the organic solvent. They may consist of dye and a precipitant therefor, both of which are soluble in the organic solvent, and which are in condition to react with each other. The so-called basic dyes are particularly desirable in my coloring medium because they are very brilliant, powerful and offer a wide range of hues. Other types of dyes may, however, be used. As precipitants for the basic dyes, I have found phospho-tungstic acid, phospho-molybdic acid and similar acids most desirable, but other suitable precipitants for the basic dyes may be used. It will be understood that in case the dyes used are not basic dyes, it is necessary to select their specific precipitants for them. Instead of using a dye and a precipitant therefor, other pigment-forming reagents may be used, such as the intermediates for insoluble azo colors or vat dyes or the like.

The amount of pigment-forming reagents which must be used may be very small. A basic dye amounting to only one-half of one per cent. of the amount of solvent has given excellent results. This appears to be because of the high coloring power of the very fine particle size of the pigment precipitated on the surface or in the pores of the material.

The thickener, if used in the composition, may be a colloid capable of being dissolved or dispersed in the organic solvent and of being eliminated or coagulated by adding water. It may consist of a water-insoluble colloid which is precipitated when water is applied, or it may be a water-soluble colloid which can be washed away when water is applied. I have found nitrocellulose most desirable as a water-insoluble thickener. Methyl cellulose may be used as a water-soluble thickener. Functions of the thickener are to give the composition a consistency convenient for application, to prevent spreading of the composition in the material to be colored, and also in many cases to bind the pigment to surfaces. The use of the thickener does not necessarily prevent the penetration of the coloring medium into the pores and fibres of the material. Whether a thickener should be used and the amount of the thickener, therefore, depend on the nature of the material to be colored and the way in which the coloring medium is applied to it.

To make the nature of my invention still more clear, I will now give specific illustrative examples of coloring media and coloring methods embodying it:

Example 1

| | | Parts |
|---|---|---|
| Dye: | Rhodamine 6G (Schultz No. 571) | 10 |
| Precipitant: | Duo deci phospho-tungstic acid | 25 |
| Thickener: | Nitrocellulose (1000 seconds viscosity) | 60 |
| Solvent: | Moisture-free diethylene-glycol-ethyl-ether | 1000 |

This composition is a viscous liquid. It is desirable especially for application to fabrics, but may be used for other materials.

To produce a colored design in a fabric, the composition is applied to the fabric or to limited areas of the fabric by printing, stencilling, brushing, hand painting or the like. The composition is liquid enough to penetrate into the fibres of the fabric but is thickened sufficiently to prevent it from spreading. After the composition has been applied in any one of these ways, the fabric is immersed in water or otherwise wetted with water. This results in the precipitation of a fine pigment on the surface and in the fibres of the fabric, with the effect that the color is fast to water and washing. Besides precipitating the pigment in the fibres, the water has the effect of washing away most or all of the organic solvent and any by-products of the precipitation reaction. The thickener is precipitated in the fibres in an impalpable form so that its presence cannot, practically, be detected by the touch. If a water-soluble thickener is substituted for the insoluble thickener in the example given, the effect is the same except that most or all of this thickener is washed away by the water.

It is possible at the same time to apply the coloring medium without, or with less of, the thickening colloid to the entire material surface, or to large areas of the same, by printing, stencilling, hand brushing, and particularly by spraying, and thereafter wetting with water by a suitable method. This permits of using the coloring material in more fluid form, where such is desirable for certain methods of application and certain types of materials to be colored. Although without the thickening colloid there will be a tendency for the spreading of the solution on the surface, still the material or the method of application may be such that this will be minimized and controlled, or the design for decoration may make this spreading immaterial or even desirable.

*Example 2*

| | | Parts |
|---|---|---|
| Dye: | Rhodamine 6G (Schultz No. 571) | 3 |
| Precipitant: | Duo deci phospho-tungstic acid | 9 |
| Thickener: | Nitrocellulose (½ second) | 30 |
| Solvent: | 1 diethylene - glycol - ethyl-ether | |
| | 3 diethylene - glycol - butyl-ether | 45 |

This composition has substantially the consistency of printing ink. It is desirable in printing on paper and many other materials in many different ways.

After application of the composition to the material by printing, water is brought into contact with the printed material. This immediately causes the precipitation of a finely divided pigment on the surface and in the surface pores of the material. This effects practically instantaneous drying or setting of the ink by precipitating the pigment in such finely divided form on surface and in their pores of the material that it clings to them very tenaciously. The moisture also has the effect of precipitating the nitrocellulose, which also serves to bind the pigment to the surface of the sheet, with the effect of fastening the pigment still more securely to the surface and effectively preventing smudging, rubbing or offsetting. Subsequent rolling, piling, and otherwise handling the printed material is rendered, as a result, more immediate and easier.

On even slightly porous surfaces such as that of ordinary paper, the finely precipitated pigment so incorporates itself in the pores of the surface that a binder is unnecessary. Consequently in printing on such surfaces, a thickener having no binding power may be substituted for nitrocellulose in the composition given.

The particles of pigment precipitated are so fine and uniform that great brilliance, lustre, uniformity of coloring, and economy in the amount of pigment used result.

Only a very small amount of water is necessary to precipitate the pigment and colloid. The forming of the pigment and the setting of the ink may, therefore, be effected by mere dampening of the printing matter, which in no way injures the paper or other material on which the coloring medium has been printed.

A further feature of the invention which is useful when the coloring medium is made of ordinary commercial, and therefore not chemically pure, materials consists in introducing a neutralizing agent to counteract the effect of possible acidity or alkalinity introduced by impurities in the pigment-forming reagents, which might otherwise have an injurious effect. Thus, in the particular compositions above specified, the precipitant, phospho-tungstic acid, may contain as an impurity some mineral acid or other strong acid which, in time, would deleteriously affect the dye. In accordance with my invention, this danger may be eliminated by introducing a weak alkali, such as diphenylamine or sodium acetate, which has a tendency to neutralize excess mineral acid or strong acid which may be present, but does not react with or impair the effectiveness of the phospho-tungstic acid precipitant.

My invention is not limited to the particular reagents which have been specified in the illustrative formulae, but includes all substances which are equivalent to them for the particular functions and purposes specified. Furthermore, the invention is not limited to the particular proportions stated in the specific examples, as they may be varied considerably without substantially changing the function and operation of the solution. Thus even if, by an increase in the proportion of pigment-forming reagents or by the presence of some water in the solution, a substantial amount of pigment or other material is precipitated so as to be visible or settle out in the solution before it is applied to the material to be colored, the further pigment which is so precipitated after the solution is applied and the material is wetted functions in the manner which has been described.

The word "solution", as used throughout the foregoing specification and in the claims which follow, is used in its common sense to include colloidal dispersions.

The word "coloring", as used in this specification and the claims which follow, is used in a generic sense to include changing the appearance of all or a part of the surface of the material and includes marking in black or white as well as in other colors.

What I claim is:

1. The process of coloring materials, which comprises applying to the material to be colored a water-miscible solution having the property of precipitating a water-insoluble pigment on the application of water, and then moistening the material with water to precipitate pigment on the material.

2. The process of coloring porous materials, which comprises coating the surface and impregnating the fibres and pores of the material with a water-miscible solution having the property of precipitating a water-insoluble pigment on the application of water, and then wetting the material with water to precipitate pigment on the surface of and in the fibres and pores of the material.

3. The process of decorating materials, which comprises coating the surface of and impregnating the fibres and pores of a definitely limited area of the material with a thickened water-miscible solution from which a water-insoluble pigment may be precipitated by the application of water, and wetting the treated material with water to precipitate the pigment on the surface of and in the fibres of said area of the material.

4. The process of printing, which comprises applying to the surface of a material an ink containing a solution having the property of precipitating a water-insoluble pigment on the application of water, and then moistening said ink on the material.

5. The process of printing, which comprises applying to the surface of a material an ink containing a solution having the property of precipitating a water-insoluble pigment and a binder on the application of water, and then moistening said ink on the material.

6. The process of printing, which comprises applying to the surface of a material an ink containing a solution having the property of precipitating a water-insoluble pigment on the application of water, and then dampening the material.

7. The process of coloring materials, which comprises dissolving pigment-forming reagents in a water-miscible organic solvent in which they are both soluble, applying the solution to the material to be colored, and applying water to the solution on the material to cause precipitation of pigment on the material.

8. The process of coloring materials, which comprises dissolving pigment-forming reagents in a water-miscible organic solvent in which they are both soluble, thickening said solution with a colloid dispersible in said solvent and precipitable therefrom by water, applying the thickened solution to the material to be colored, and applying water to the solution on the material to cause precipitation of pigment and colloid on the material.

9. The process of coloring materials, which comprises dissolving pigment-forming reagents in a water-miscible organic solvent in which they are both soluble, thickening said solution in a colloid dispersible in said solvent and soluble in water, applying said thickened solution to the material to be colored, and applying water to the material to cause precipitation of pigment on the material and to wash away the colloid.

ALBERT E. GESSLER.